US012592508B2

(12) United States Patent
Franco Núñez et al.

(10) Patent No.: US 12,592,508 B2
(45) Date of Patent: Mar. 31, 2026

(54) WAVE SPRING-BASED INTERCONNECT PROBES

(71) Applicant: Intel Corporation, Santa Clara, CA (US)

(72) Inventors: Ismael Franco Núñez, Milwaukie, OR (US); Daqiao Du, Lake Oswego, OR (US); Zhen Zhou, Chandler, AZ (US); Gordon P. Melz, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 1049 days.

(21) Appl. No.: 17/384,091

(22) Filed: Jul. 23, 2021

(65) Prior Publication Data

US 2021/0351535 A1 Nov. 11, 2021

(51) Int. Cl.

| | |
|---|---|
| ***H01R 13/24*** | (2006.01) |
| ***H01R 12/70*** | (2011.01) |
| ***H01R 12/71*** | (2011.01) |
| *H01R 12/57* | (2011.01) |

(52) U.S. Cl.

CPC ..... *H01R 13/2407* (2013.01); *H01R 12/7082* (2013.01); *H01R 12/714* (2013.01); *H01R 12/57* (2013.01)

(58) Field of Classification Search

CPC ........ H01R 12/7082–714; H01R 12/24; H01R 12/52; H01R 12/00; H01R 13/2421; H01R 13/2435

See application file for complete search history.

(56) References Cited

U.S. PATENT DOCUMENTS

| | | | | |
|---|---|---|---|---|
| 5,286,220 | A * | 2/1994 | Watson | H01R 13/523 439/589 |
| 5,800,184 | A * | 9/1998 | Lopergolo | G01R 1/06738 439/862 |
| 2005/0064739 | A1* | 3/2005 | Searls | H01R 12/52 439/66 |
| 2009/0221186 | A1* | 9/2009 | Nakayama | G01R 1/07314 439/660 |
| 2012/0043987 | A1* | 2/2012 | Lou | G01R 1/06716 324/756.03 |
| 2020/0049761 | A1* | 2/2020 | Liu | G01R 1/06716 |
| 2020/0225265 | A1* | 7/2020 | Hironaka | G01R 1/07314 |

OTHER PUBLICATIONS

Interposers—Custom Spring Probe Solutions, Smiths Interconnect, Bring Technology to Life, as accessed on Oct. 25, 2021 https://www.smithsinterconnect.com/CMSPages/GetFile.aspx?guid=60393f19-bb14-48e4-9cc3-8c2c8e9cd90f, 12 Pages.

* cited by examiner

*Primary Examiner* — Tho D Ta
*Assistant Examiner* — Carlos E Lopez-Pagan
(74) *Attorney, Agent, or Firm* — Alliance IP, LLC

(57) ABSTRACT

In one embodiment, an interconnect apparatus (e.g., an interposer apparatus) includes a plurality of interconnect probes that each include a wave spring structure that includes a plurality of stacked wave spring discs. The wave spring discs may be formed in a sinusoidal wave form shape, or in another wave form shape.

21 Claims, 13 Drawing Sheets

802

804

WAVE SPRING-BASED INTERCONNECT PROBES

TECHNICAL FIELD

This disclosure relates in general to the field of computer systems and, more particularly, to interconnect probes that include wave springs.

BACKGROUND

Socket pin-based interconnects that incorporate coil spring designs may be difficult to implement in fine pitch designs (e.g., <0.45 mm). At such pitches, the interconnect must be very short to limit cross talk. However, the thermal mechanical (e.g., contact force, current carrying capacity, mechanical lifespan and reliability, etc.) performance will suffer as the compressed height is decreased and cross-section area is reduced. Thus, signal integrity and thermal mechanical reliability will have competing targets as size is reduced. For instance, depending on pitches, there can be trade-offs between electrical (e.g., short pins—like elastomer) and mechanical stability (e.g., spring probes>2 mm tall), or combinations between these two extremes. Durability may also a challenge for socketed interconnects.

BRIEF DESCRIPTION OF THE DRAWINGS

Like reference numbers and designations in the various drawings indicate like elements.

DETAILED DESCRIPTION OF EXAMPLE EMBODIMENTS

Figure 1:
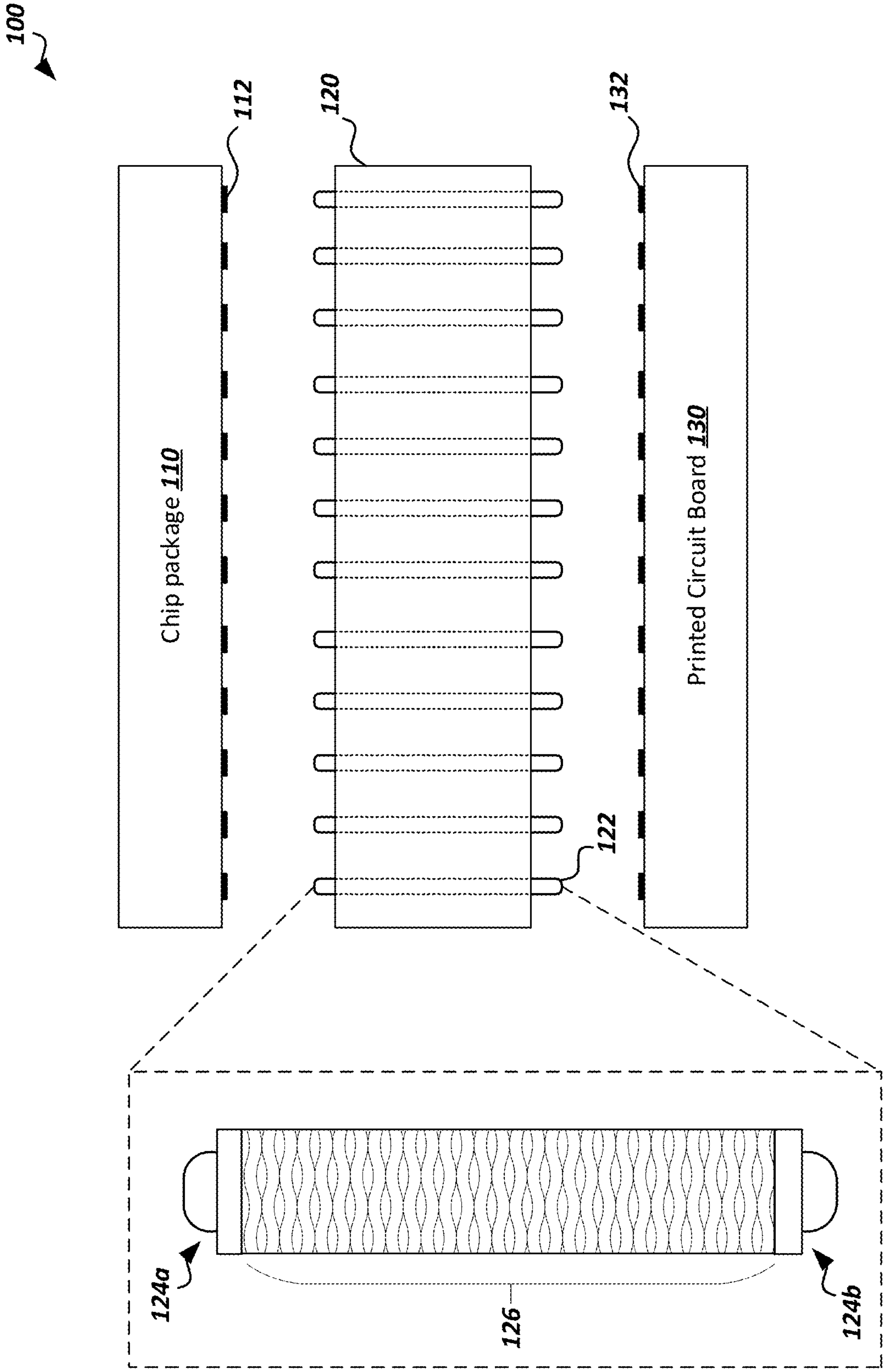
FIG. 1 illustrates an example system that includes an interposer apparatus with wave spring-based interconnect probes in accordance with embodiments of the present disclosure.

In the following description, numerous specific details are set forth, such as examples of specific configurations, structures, architectural details, etc. in order to provide a thorough understanding of the present disclosure. It will be apparent, however, to one skilled in the art that these specific details need not be employed to practice embodiments of the present disclosure. In some instances, well known components or methods may be utilized, and such details haven't been described in detail in order to avoid unnecessarily obscuring embodiments of the present disclosure.

Socket pin-based interconnects that incorporate coil spring designs may be difficult to implement in fine pitch designs (e.g., <0.45 mm). At such pitches, the interconnect must be very short to limit cross talk. However, the thermal mechanical (e.g., contact force, current carrying capacity, mechanical lifespan and reliability, etc.) performance will suffer as the compressed height is decreased and cross-section area is reduced. Thus, signal integrity and thermal mechanical reliability will have competing targets as size is reduced. For instance, depending on pitches, there can be trade-offs between electrical (e.g., short pins—like elastomer) and mechanical stability (e.g., spring probes>2 mm tall), or combinations between these two extremes. Durability may also a challenge for socketed interconnects.

Particular embodiments of the present disclosure may, in some instances, eliminate such tradeoffs by incorporating wave spring structures. For example, some embodiments may include a spring structure that is composed of stacked metal discs with pre-bent wave profiles or wound flat metal string discs instead of a traditional coil spring structure. These wave spring disc-based spring structures, when used in interconnect apparatuses such as interposers, may provide one or more benefits over previous solutions. For example, the wave spring structure may provide improved signal Integrity by mitigating crosstalk with a diversified magnetic field to adjacent finer-pitch conductors. Moreover, the wave spring structure may provide for a lowered compressed height when compared with the coil spring alternative. In addition, wave spring structures may provide adjustable interconnect impedance, e.g., by tuning the geometrical shapes of each wave spring disc, as well as reduced inductance (by providing balanced capacitance). Further, wave spring structures may provide improved power delivery by providing parallel current paths through the spring (vs. the one spiral current path in a coil spring structure) and accordingly reduced contact resistance without the need for increasing the amount of compression force. Still further, the wave spring structures described herein may diversify the electric current flow vectors to achieve specifically designated divergence and convergence of magnetic fields.

On the manufacturing side, wave spring structures may provide a simplified assembling process and component count, reducing component counts and costs while maintaining the mechanical stability level of the spring. For example, aspects of the present disclosure may eliminate multiple moving contact surfaces between plungers, coil springs, and barrels found within a conventional spring probe pin. This also allows for reduction of eliminates the electrical contact resistance in the wave spring-based probes vs. coil spring-based probes.

FIG. 1 illustrates an example system 100 that includes an interposer apparatus 120 with wave spring-based interconnect probes 122 in accordance with embodiments of the present disclosure. The example system 100 includes a chip package 110 that is connected to a printed circuit board (PCB) 130 via the interposer apparatus 120. The chip package may include one or more processors, accelerators, or other type of data processing apparatuses, and in some instances, may be implemented as a system-on-chip (SoC). The PCB 130 may include a number of circuit components that interact with the chip package 110, e.g., interconnect buses, memory circuits, power/ground pins, and/or other data processing apparatuses, and in some instances, may be implemented as a motherboard of a computer system.

The interposer apparatus 120 includes a number of wave spring-based interconnect probes 122 to electrically connect the electrical contact pads 112 of the chip package 110 to the electrical contact pads 132 of the PCB 130. As shown, each interconnect probe 122 (which may also be referred to as an interconnect pin in some instances) includes a set of stacked wave spring discs 126 with top and bottom connectors 124. In the example shown, the stacked wave spring discs 126 are formed in a sinusoidal wave shape; however, the wave spring discs 126 may be formed in another wave form, e.g., as described further below.

Figure 2C:
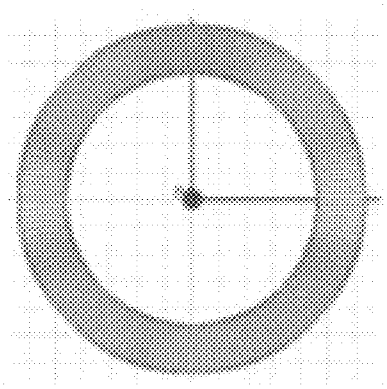
FIGS. 2A-2C illustrate side, perspective, and top views of an example wave spring disc stack.
Figure 2B:
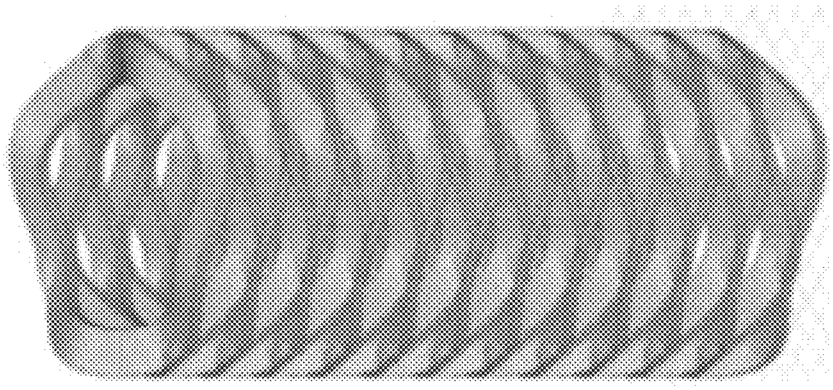
Figure 2A:
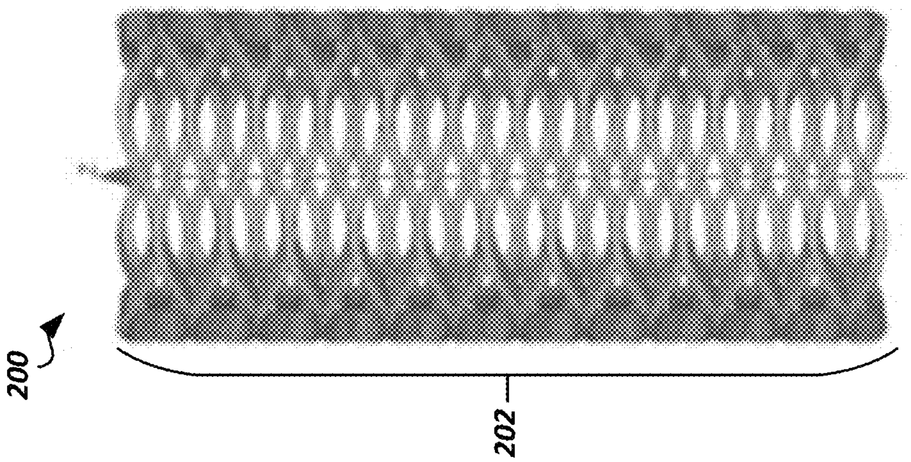

FIGS. 2A-2C illustrate side, perspective, and top views of an example wave spring disc stack 200 (e.g., the stacked wave spring discs 126 of FIG. 1). As shown, the wave spring discs 202 of the stack 200 are circular discs (from the top view) formed in a sinusoidal wave shape (from the side view). The sinusoidal wave spring discs 202 are stacked on one another such that the peaks of the sinusoid waveforms form points of contact between the respective discs. In some embodiments, these points of contact may be coupled to one another via welding, conducting adhesive, or in another manner to form rigid wave spring structures. Interconnect probe end connectors may be added to each end of the wave spring disc stack 200 (e.g., as shown in the interconnect probe 122 of FIG. 1). While the example stack 200 of FIG. 2 includes wave spring discs 202 formed in a sinusoidal shape, the wave spring discs of the stack 200 may be formed in another manner. Further, while a certain number of wave spring discs 202 are shown in the stack 200, the number of discs may vary between embodiments. Still further, while the wave spring discs of the stack 200 have a particular wave sinusoidal wave periodicity, it will be understood that the wave form may be different than shown, e.g., the type of disc waveform, the period of the waveform of the disc, the height of the waveform/disc, or a combination thereof. For instance, the waves per disc may be infinitely adjustable.

Figures 2D, 2E:
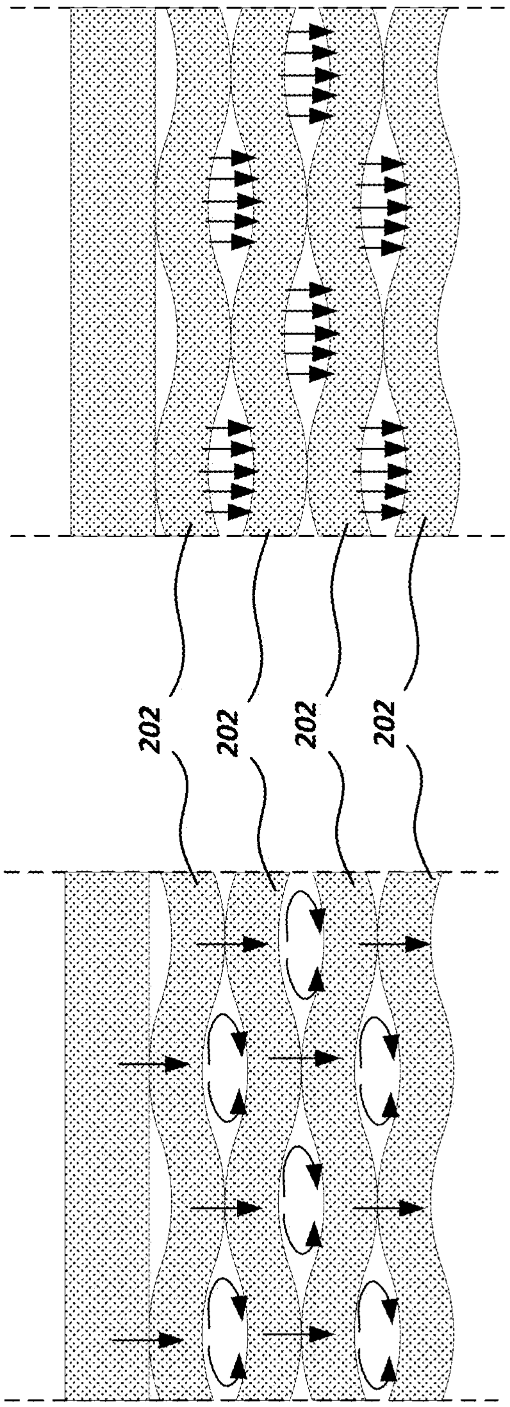
FIGS. 2D-2E illustrate example current paths in the wave spring discs of the wave spring disc stack of FIGS. 2A-2C.

FIGS. 2D-2E illustrate example current paths in the wave spring discs 202 of the stack 200 of FIGS. 2A-2C. In particular, FIG. 2D illustrates example direct current (DC) paths in the wave spring discs 202, and FIG. 2E illustrates example alternative current (AC) paths in the wave spring discs 202. As shown in FIG. 2D, the DC current may flow through multiple paths in the wave spring discs 202 of the stack 200, as compared with the one spiral current path that is present in a traditional coil spring. As shown in FIG. 2E, capacitively coupled, high frequency AC current may flow between parallel flat surfaces of the wave spring discs 202 as non-contact current paths.

Figure 3C:
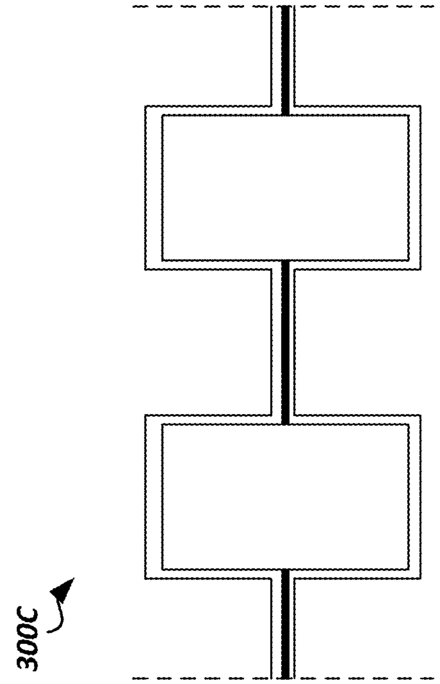
FIGS. 3A-3D illustrate example waveform shapes that may be implemented in the wave spring discs of a wave spring structure in accordance with embodiments of the present disclosure.
Figure 3D:
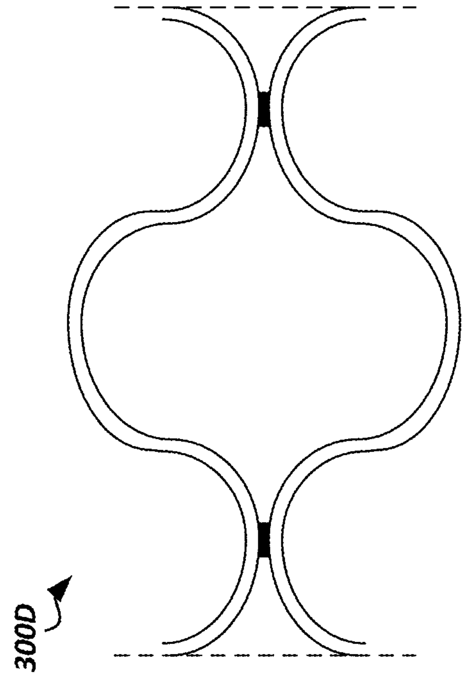
Figure 3A:
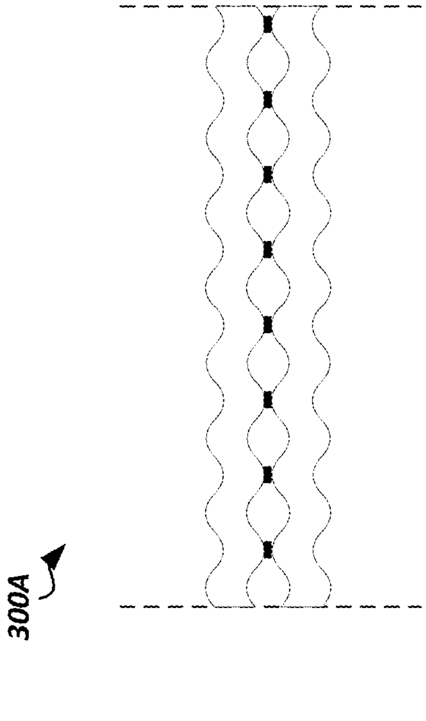
Figure 3B:
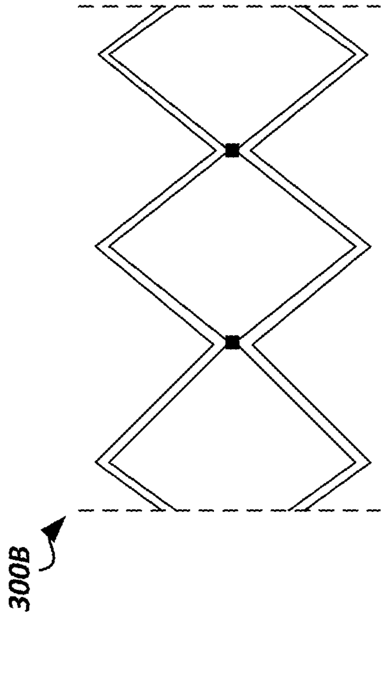

FIGS. 3A-3D illustrate example waveform shapes that may be implemented in the wave spring discs of a wave spring structure in accordance with embodiments of the present disclosure, such as, for example, the stack 200 of FIGS. 2A-2C or stacked wave spring discs 126 of the interconnect probe 122 of FIG. 1. In particular, FIGS. 3A-3D illustrate side views of the example waveform shapes. FIG. 3A illustrates an example sinusoidal waveform shape 300A that is similar to that shown in FIGS. 1, 2A-2C, but with a shorter wave period/higher frequency. This may lead to additional contact points between each wave spring disc in a stack. By altering the wave period/frequency of the wave discs in a stack, the wave spring disc structure can be electrically tuned to have desired properties, e.g., electrical resistance, capacitance, and/or inductance. FIG. 3B illustrates an example triangle waveform shape 300B, FIG. 3C illustrates an example square waveform shape 300C, and FIG. 3D illustrates an example semi-circular waveform shape 300D.

Embodiments of the present disclosure may incorporate wave spring discs of other waveform shapes than those shown, or in variations of the waveforms shown (e.g., longer or shorter wave periods or heights). In addition, the thickness of each wave spring disc may be altered to tune the electrical properties of the overall wave spring structure. Further, the wave spring structure can include any combination of these or other shapes. In some instances, certain waveform shapes may be formed to be compressible, while others may be formed to be rigid, e.g., for embedded or discrete interconnect applications as described in at least one embodiment below.

Figure 4B:
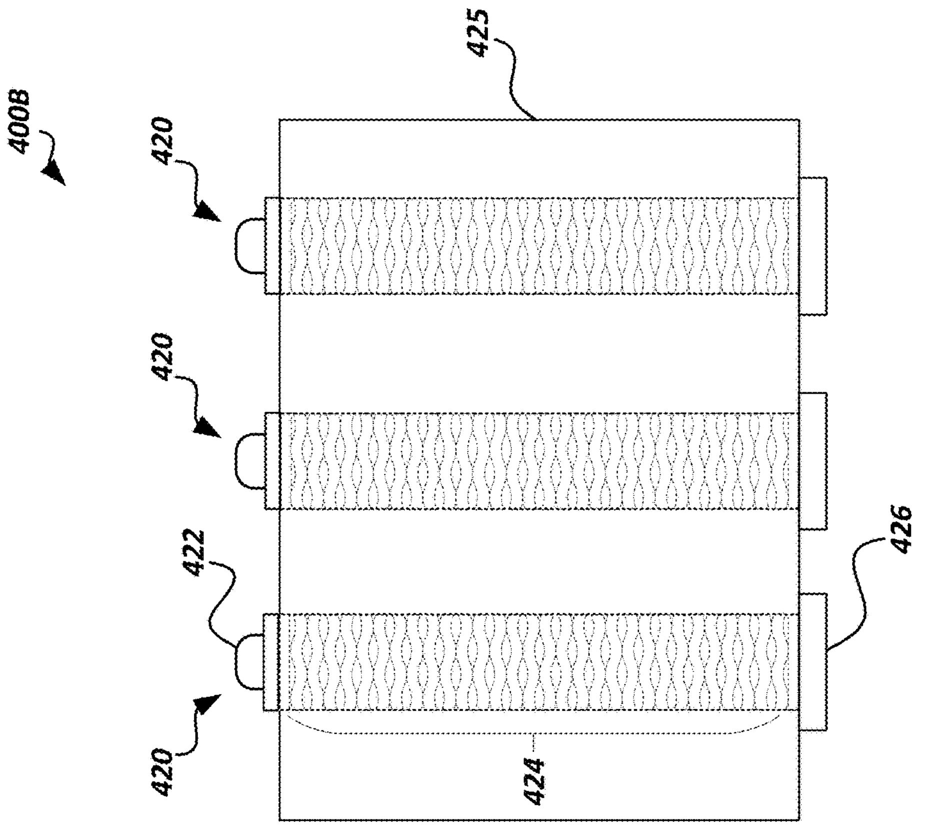
FIGS. 4A-4B illustrate example interposer apparatuses with wave spring-based interconnect probes in accordance with embodiments of the present disclosure.
Figure 4A:
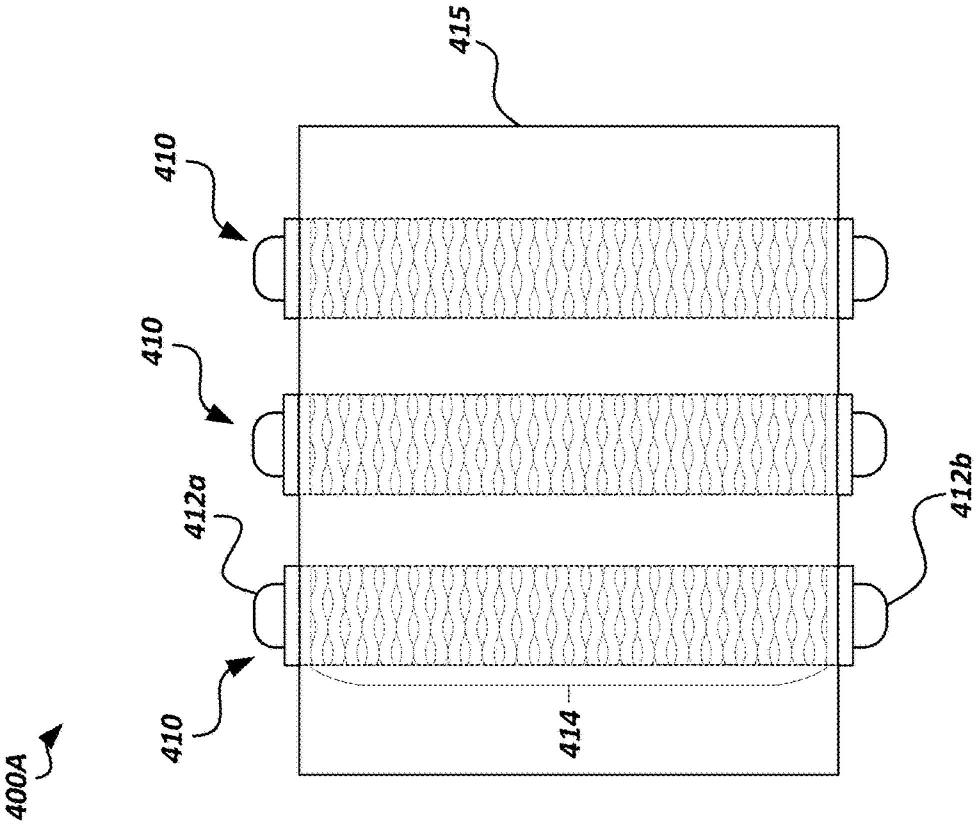

FIGS. 4A-4B illustrate example interposer apparatuses 400 with wave spring-based interconnect probes in accordance with embodiments of the present disclosure. In particular, the example interposer apparatus 400A of FIG. 4A includes wave spring-based interconnect probes 410 inside a housing 415. The interconnect probes 410 each include a wave spring disc stack 414 that is terminated on each with a compression-type connector 412. The interconnect probes 410 are configured to compress on each end when pressure is applied. For instance, when the interposer apparatus 400A is placed in between two other devices (e.g., a chip package and PCB as in the example shown FIG. 1) and the components are all pressed together, the pressure exerted by the other device onto each end of the probes 410 compresses the wave spring disc stack 414 and move the ends inward (i.e., toward the inside of the housing 415).

In comparison, the example interposer apparatus 400B of FIG. 4B includes wave spring-based interconnect probes 420 inside a housing 425 that each include a wave spring disc stack 424 that is terminated on one end with a compression-type connector 422 and on the other end with a surface mount-type connector 426. That is, the end of the probe 420 with the surface mount-type connector 426 is fixed with respect to the housing 425. As such, the interconnect probes 420 are configured to compress on only one end of the probe 420 (e.g., as described above), with the other end of the probe 420 is configured similar to a surface mount electrical contact pad (which, when placed in contact with another device, e.g., similar to FIG. 1, will not cause compression of the wave spring disc stack 424).

Although each example interposer apparatus includes the same types of interconnect probes, an interposer apparatus in accordance with the present disclosure may include a combination of the types shown in FIGS. 4A-4B, e.g., with a first set of dual compression type interconnect probes as in FIG. 4A and a second set of single compression type interconnect probes as in FIG. 4B.

In some embodiments, the connectors 412A and 412B of the probes 420 can be part of an integrated interconnect, or in other embodiments, may be omitted from the apparatus entirely.

Figure 5A:
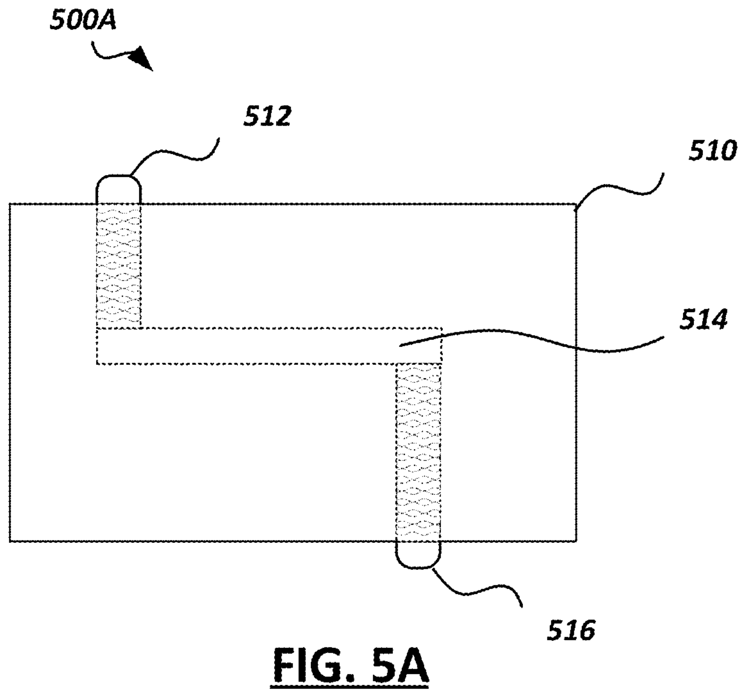
FIGS. 5A-5B illustrate example space transformer interposer apparatuses with wave spring-based interconnect probes in accordance with embodiments of the present disclosure.
Figure 5B:
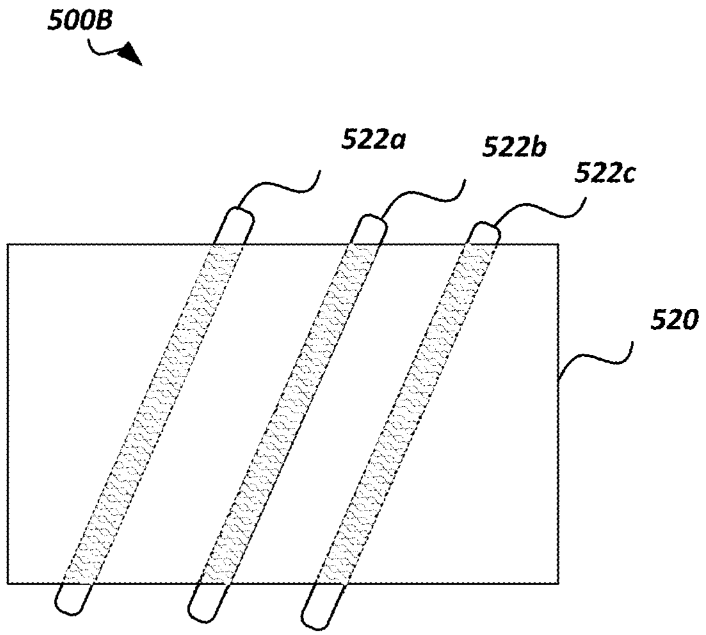

FIGS. 5A-5B illustrate example space transformer interposer apparatuses 500 with wave spring-based interconnect probes in accordance with embodiments of the present disclosure. The example apparatuses 500 can translate or rotate connection planes, in certain instances.

The example transformer interposer apparatus 500A shown in FIG. 5A includes a first interconnect probe 512 that is coupled to a second interconnect probe 516 at a different spatial location within the housing 510 of the apparatus 500A via an electrically conductive connector 514. In some embodiments, the electrically conductive connector 514 may also include wave spring discs as described herein. In this way, the ends of the interconnect probes 512, 516 extend outward from the housing in different spatial locations with respect to at least one axis of the apparatus 500A (e.g., the vertical axis in the example shown, and/or the axis going into the page). Each of the interconnect probes 512, 516 in the example shown incorporates a wave spring structure that includes a stack of sinusoidal wave spring discs, e.g., similar to those described above, and each includes a compression-type connector similar to the compression-type connector of FIGS. 4A-4B. However, other embodiments may incorporate other types of wave spring discs or connectors. For instance, one of the interconnect probes 512, 516 may include a surface mount-type connector similar to the ones shown in FIG. 4B.

The example transformer interposer apparatus 500B shown in FIG. 5B includes a set of wave spring-based interconnect probes 522 that are positioned non-orthogonally with respect to the housing 520 such that each end of the interconnect probes 522 extends outward from the housing 520 at a different spatial location with respect to at least one axis of the apparatus 500B (e.g., the vertical axis in the example shown, and/or the axis going into the page). Each of the interconnect probes 522 in the example shown incorporates a wave spring structure that includes a stack of sinusoidal wave spring discs, e.g., similar to those described above, and includes compression-type connectors on each end of the probe 522, similar to the compression-type connector of FIGS. 4A-4B. However, other embodiments may incorporate other types of wave spring discs or connectors. For instance, one end of the interconnect probes 522 may include a surface mount-type connector similar to the ones shown in FIG. 4B.

Figure 6:
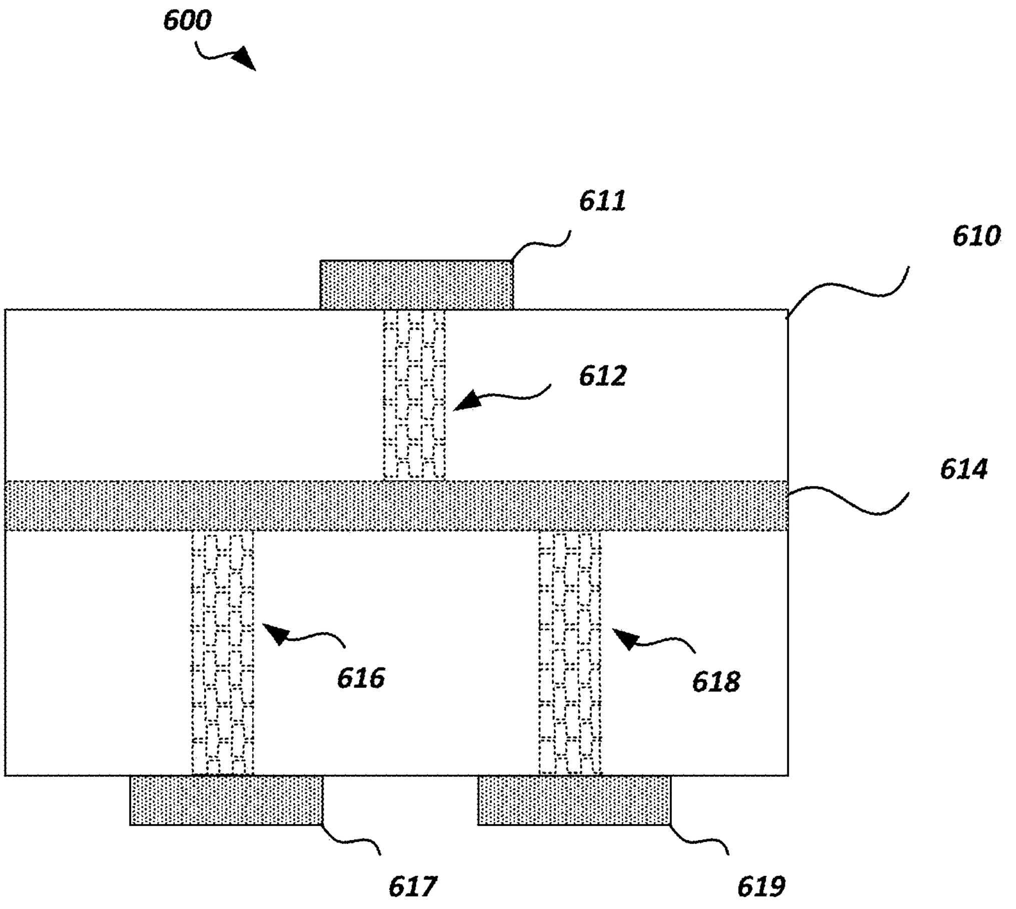
FIG. 6 illustrates an example system that includes a substrate with vias formed with fixed wave spring structures in accordance with embodiments of the present disclosure.

FIG. 6 illustrates an example system 600 that includes a substrate 610 with vias 612, 616, 618 formed with fixed wave spring structures in accordance with embodiments of the present disclosure. In particular, the system 600 includes a substrate 610 with three layers—an electrical contact pad 611 is formed on the top (first) layer of the substrate 610, an electrical contact layer 614 is formed within the substrate 610 (a second layer of the substrate), and additional electrical contact pads 617, 619 are formed on the bottom (third) layer of the substrate 610. The via 612 electrically connects the pad 611 of the first layer of the substrate 610 with the contact layer 614 of the second layer of the substrate 610. The via 616 electrically connects the contact layer 614 of the second layer of the substrate 610 with the pad 617 of the third layer of the substrate 610, and the via 618 electrically connects the contact layer 614 of the second layer of the substrate 610 with the pad 619 of the third layer of the substrate 610. The substrate may be formed with any suitable material, such as silicon or silicon-based substrate materials (e.g., doped silicon).

The vias 612, 616, 618 of FIG. 6 are formed with wave spring discs that are fixed with respect to the substrate 610. The square wave spring discs may allow the wave spring structure to be fixed (i.e., won't compress under pressure) similar to current metal vias, while also allowing for one or more of the advantages of wave spring technologies. For example, a fixed wave spring disc structure may allow for tunability of one or more electrical properties (e.g., resistance, capacitance, and/or inductance) of the vias 612, 616, 618 through one or more properties of the wave spring structure, e.g., periodicity of the wave form of the spring discs. Although shown as being formed in a square wave form, the wave spring-based vias 612, 616, 618 may be formed with another type of wave form that allows the via to be fixed with respect to the substrate 610.

In certain instances, interconnect apparatuses (e.g., an interposer apparatus) incorporating wave spring structures as described herein can offer the same spring force as a traditional coil spring structures when used in, but at a shorter height (e.g., as much as 50% shorter spring height). Furthermore, the wave spring discs of the stack 200 may electrically induce displacement current to alter and disperse magnetic and electrical field, along each interconnect probe/pin, thereby controlling and potentially reducing unwanted pin to pin coupling (electrical crosstalk) to adjacent pins in a pin array (e.g., in an interposer apparatus such as interposer apparatus 120 of FIG. 1). At the same time, the impedance on a pin can be more optimally configured by adjusting the diameter and/or cycles of the disc waveforms around the circumference. This may serve to further minimize the operating height of the wave spring structure, lowering its electrical resistance and self-inductance.

Figure 7A:
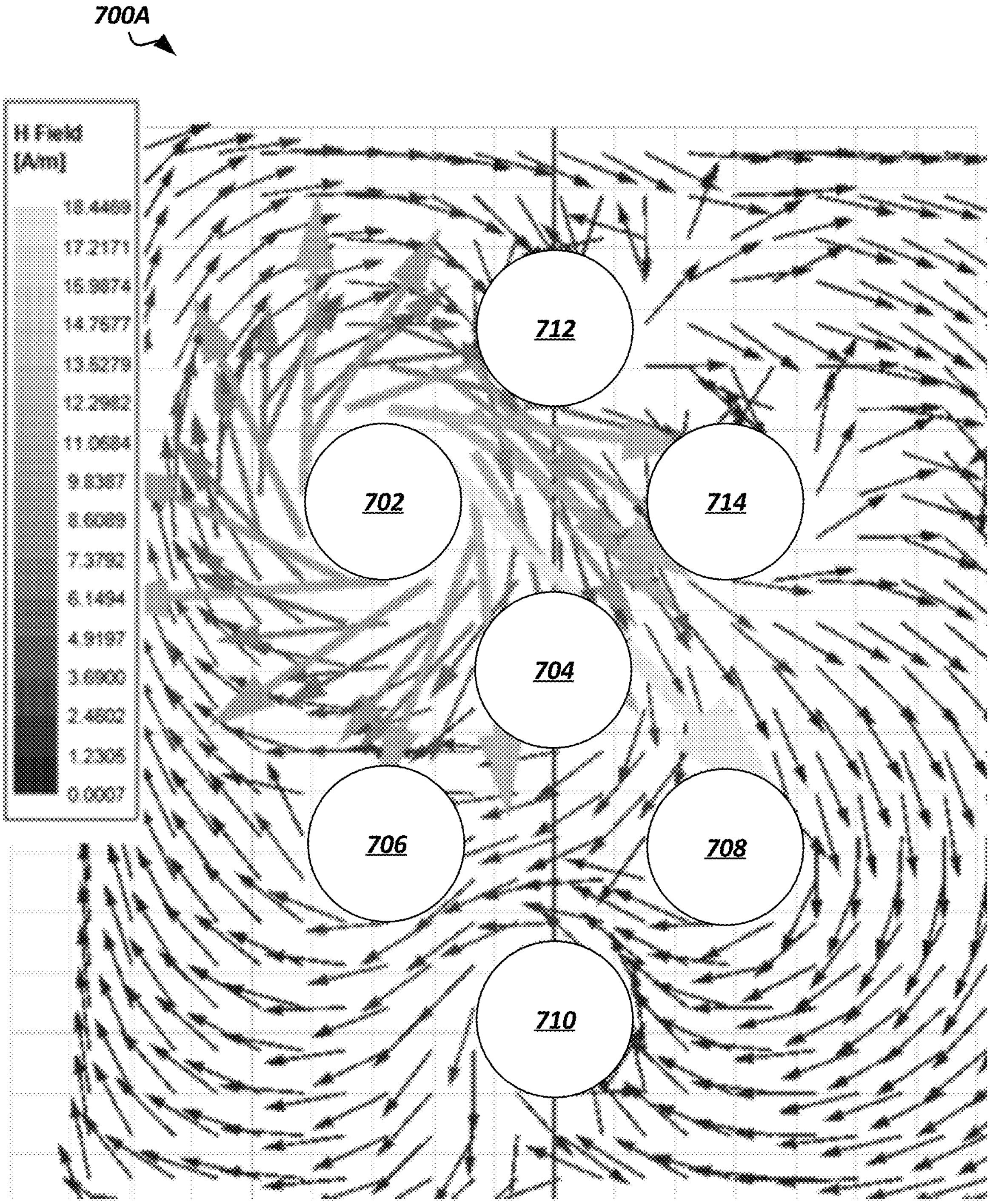
FIGS. 7A-7B illustrate example magnetic field simulation data for an interconnect probe array that includes wave spring structures in accordance with embodiments of the present disclosure.
Figure 7B:
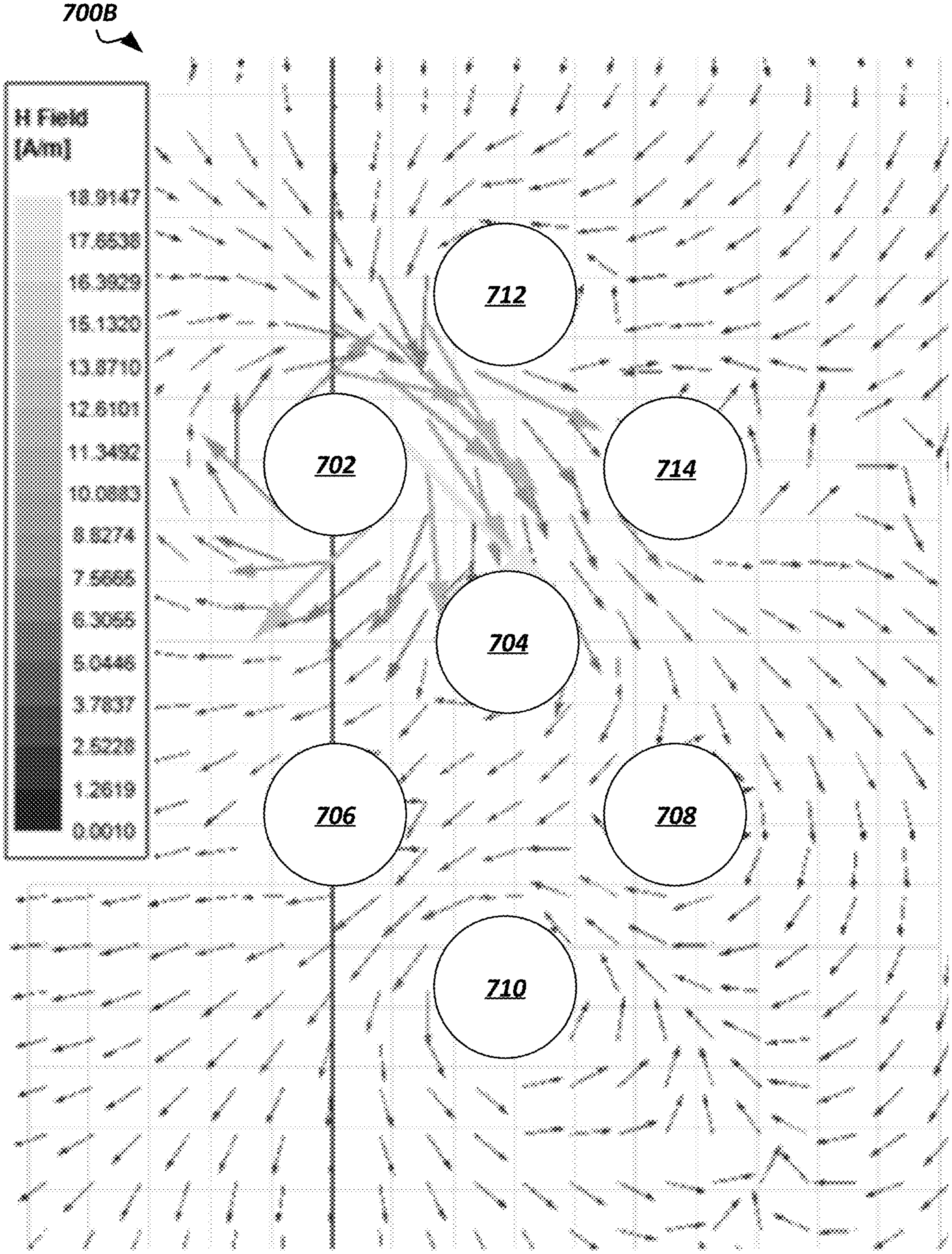

FIGS. 7A-7B illustrate example magnetic field simulation data 700 for an interconnect probe array that includes wave spring structures in accordance with embodiments of the present disclosure. In particular, FIGS. 7A-7B illustrate a magnetic field (H-field) distribution around the pins/probes of the array, where FIG. 7A is an array that includes wave spring-based interconnect probes and FIG. 7B is an array that includes coil spring-based interconnect probes with solid barrel bodies. In the example simulation data, the probe 702 is the aggressor pin. The simulated interconnect probe array was created based on a typical DDR ball-map, where the probes 702, 704 are first signal pins, 706, 708 are second signal pins, and 710, 712, 714 are ground pins. It will be seen from FIG. 7A that the intentionally diversified magnetic field has better coupling to ground pins 712 and 714 nearby, as well as less desired coupling (cross-talk) to adjacent signal pins 704 and 706.

The example interconnect probe array shown may reside between a processor silicon package and a mainboard/motherboard. Memory data pins form a single-ended interface, highly susceptible to undesired signal crosstalk (XTALK), especially at a finer ball pitch (e.g., 0.40 mm in the simulation), where the individual signal pins are physically closer each other. The example simulation data illustrate that the wave spring-based interconnect probes allow for the current distribution to be dispersed through multiple directions and paths, resulting in a divergent magnetic field density around pins.

Figure 8A:
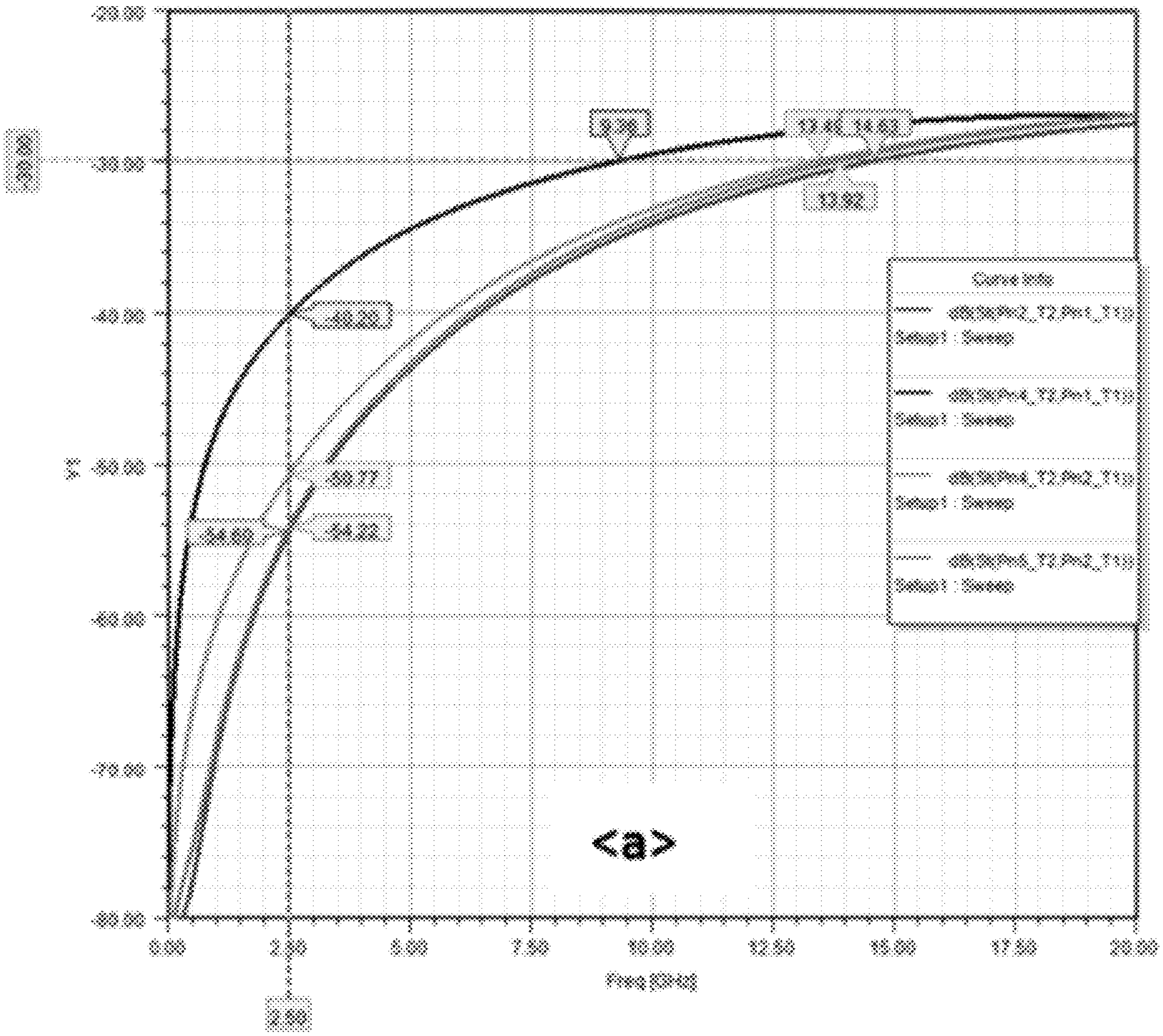
FIGS. 8A-8B illustrate example far end crosstalk (FEXT) simulation data for an interconnect probe array that includes wave spring structures in accordance with embodiments of the present disclosure.
Figure 8B:
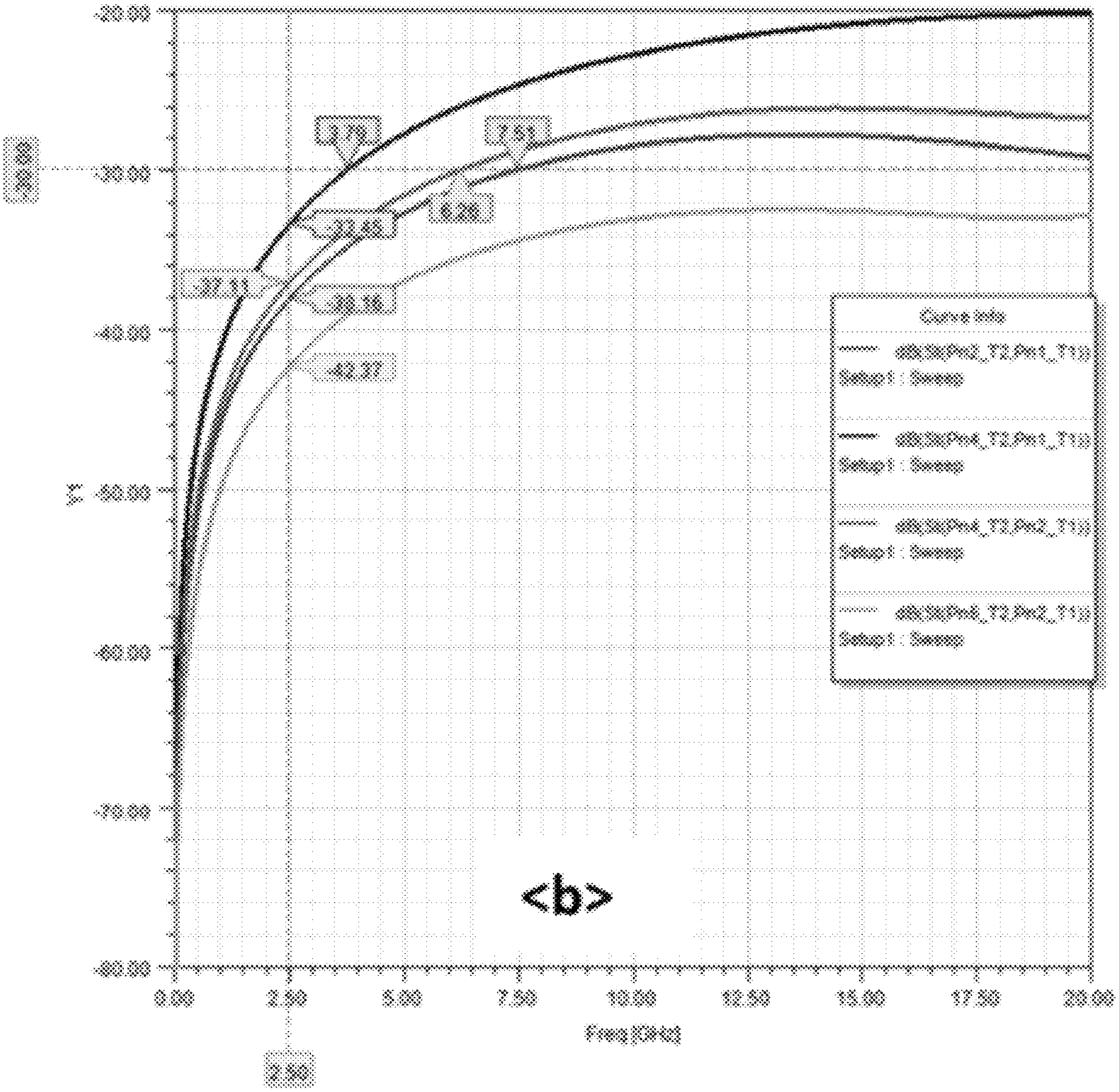

FIGS. 8A-8B illustrate example far end crosstalk (FEXT) simulation data 802, 804 for an interconnect probe array that includes wave spring structures in accordance with embodiments of the present disclosure. In particular, the FEXT simulation data 802, 804 correspond to the arrays shown in FIGS. 7A-7B, respectively. The example data 802, 804 illustrate that a XTALK improvement is seen for the wave spring-based interconnect probe array vs. the coil spring-based array. Further, in the examples shown, example XTALK values are called out for a DDR5-range Nyquist frequency of 2.5 GHz; however, XTALK improvements are seen well past this frequency range, as shown. As seen in FIGS. 8A-8B, undesired crosstalk improves for all pins including those at the edge of the ball-map by significant amounts (e.g., 7 to 12 dB). In some cases, this can represent a reduction of XTALK by more than half.

Figure 9:
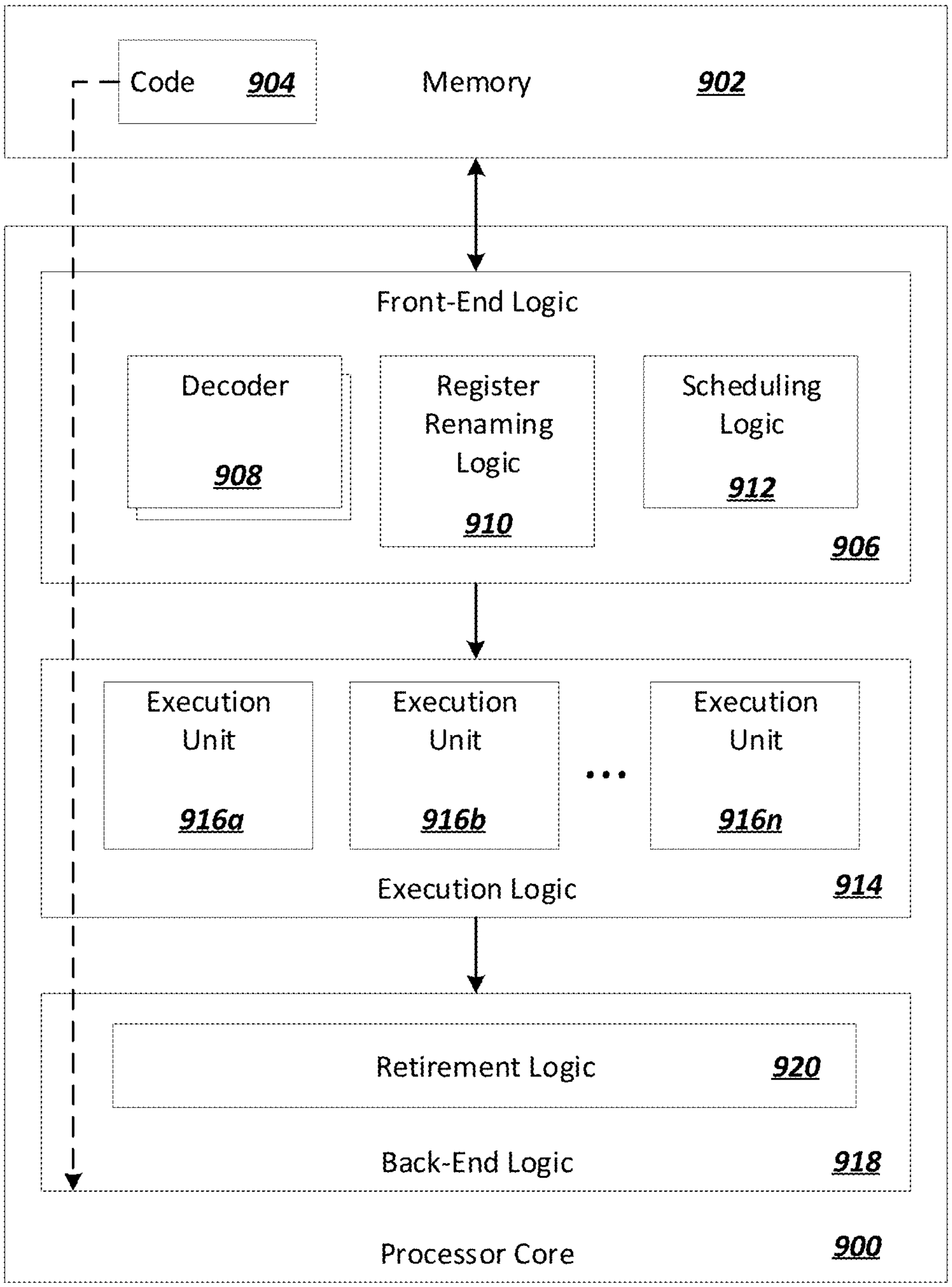
FIG. 9 is an example illustration of a processor according to an embodiment.
Figure 10:
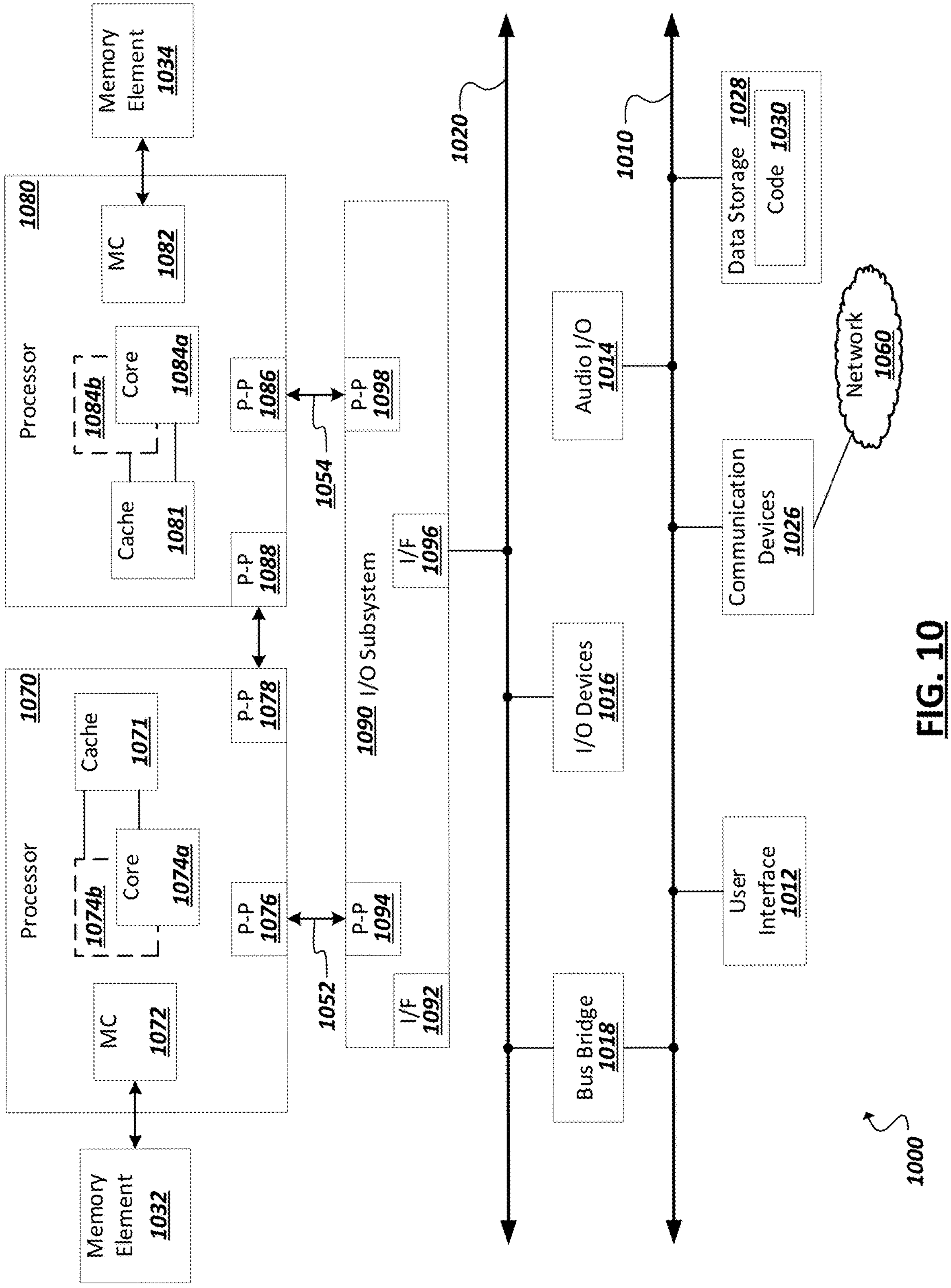
FIG. 10 illustrates a computing system that is arranged in a point-to-point (PtP) configuration according to an embodiment.

FIGS. 9-10 are block diagrams of example computer architectures that may be used in accordance with embodiments disclosed herein. For example, in some embodiments, a computer system may contain one or more aspects shown in FIGS. 9-10 and may implement one or more aspects of the present disclosure described above. Other computer architecture designs known in the art for processors and computing systems may also be used. Generally, suitable computer architectures for embodiments disclosed herein can include, but are not limited to, configurations illustrated in FIGS. 9-10.

FIG. 9 is an example illustration of a processor according to an embodiment. Processor 900 is an example of a type of hardware device that can be used in connection with the implementations above. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916*a*, 916*b*, 916*n*, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 1000.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a co-processor 1038, such as a high-performance graphics circuit, machine learning accelerator, or other co-processor 1038, via an interface 1039, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a user interface 1012 (such as a keyboard, mouse, touchscreen, or other input devices), communication devices 1026 (such as modems, network interface devices, or other types of communication devices that may communicate through a computer network 1060), audio I/O devices 1016, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. It will be understood that certain examples may be combined with certain other examples, in certain embodiments.

Example 1 includes an interposer apparatus comprising: a housing; and a plurality of interconnect probes positioned within the housing such that opposite ends of the interconnect probe are disposed outside the housing, wherein each interconnect probe comprises a wave spring structure comprising a plurality of stacked wave spring discs.

Example 2 includes the subject matter of Example 1, wherein the housing comprises first and second parallel outer surfaces, and at least one of the interconnect probes is positioned within the housing such that a first end of the interconnect probe extends outward from the first parallel outer surface of the housing and a second end of the interconnect probe opposite the first end extends outward from the second parallel outer surface of the housing.

Example 3 includes the subject matter of Example 2, wherein the first and second ends extend orthogonally from the first and second outer surfaces of the housing, respectively.

Example 4 includes the subject matter of Example 2 or 3, wherein the first and second ends are disposed in different spatial locations of the housing with respect to at least one axis.

Example 5 includes the subject matter of Example 2, wherein the first and second ends extend non-orthogonally from the first and second outer surfaces of the housing, respectively.

Example 6 includes the subject matter of any one of Examples 1-5, wherein at least one interconnect probe comprises wave spring discs formed in a sinusoidal wave shape.

Example 7 includes the subject matter of any one of Examples 1-5, wherein at least one interconnect probe comprises wave spring discs formed in a semi-circular wave shape.

Example 8 includes the subject matter of any one of Examples 1-5, wherein at least one interconnect probe comprises wave spring discs formed in a square wave shape.

Example 9 includes the subject matter of any one of Examples 1-5, wherein at least one interconnect probe comprises wave spring discs formed in a triangular wave shape.

Example 10 includes the subject matter of any one of Examples 1-9, wherein at least one end of the interconnect probe is arranged to allow the wave spring structure to compress when pressure is applied to the end of the interconnect probe.

Example 11 includes the subject matter of any one of Examples 1-9, wherein at least one end of the interconnect probe is fixed with respect to the housing.

Example 12 includes the subject matter of any one of Examples 1-11, the wave spring discs of the wave spring structure are welded together.

Example 13 includes the subject matter of any one of Examples 1-11, wherein the wave spring discs of the wave spring structure are coupled together with adhesive.

Example 14 includes a system comprising: a chip package comprises a first set of electrical contact pads; a printed circuit board (PCB) comprising a second set of electrical contact pads; and an interposer apparatus disposed between the chip package and PCB, the interposer apparatus comprising a plurality of interconnect probes to electrically connect the first set of electrical contact pads and the second set of electrical contact pads, each interconnect probe comprising a wave spring structure comprising a plurality of wave spring discs in a stack.

Example 15 includes the subject matter of Example 14, wherein the housing comprises first and second parallel outer surfaces, and at least one of the interconnect probes is positioned within the housing such that a first end of the interconnect probe extends outward from the first parallel outer surface of the housing and a second end of the interconnect probe opposite the first end extends outward from the second parallel outer surface of the housing.

Example 16 includes the subject matter of Example 15, wherein the first and second ends extend orthogonally from the first and second outer surfaces of the housing, respectively.

Example 17 includes the subject matter of Example 15 or 16, wherein the first and second ends are disposed in different spatial locations of the housing with respect to at least one axis.

Example 18 includes the subject matter of Example 15, wherein the first and second ends extend non-orthogonally from the first and second outer surfaces of the housing, respectively.

Example 19 includes the subject matter of any one of Examples 14-18, wherein at least one interconnect probe comprises wave spring discs formed in a sinusoidal wave shape.

Example 20 includes the subject matter of any one of Examples 14-18, wherein at least one interconnect probe comprises wave spring discs formed in a semi-circular wave shape.

Example 21 includes the subject matter of any one of Examples 14-18, wherein at least one interconnect probe comprises wave spring discs formed in a square wave shape.

Example 22 includes the subject matter of any one of Examples 14-18, wherein at least one interconnect probe comprises wave spring discs formed in a triangular wave shape.

Example 23 includes the subject matter of any one of Examples 14-22, wherein at least one end of the interconnect probe is arranged to allow the wave spring structure to compress when pressure is applied to the end of the interconnect probe.

Example 24 includes the subject matter of any one of Examples 14-22, wherein at least one end of the interconnect probe is fixed with respect to the housing.

Example 25 includes the subject matter of any one of Examples 14-24, the wave spring discs of the wave spring structure are welded together.

Example 26 includes the subject matter of any one of Examples 14-24, wherein the wave spring discs of the wave spring structure are coupled together with adhesive.

Example 27 includes the subject matter of any one of Examples 14-26, wherein the chip package comprises a processor.

Example 28 includes the subject matter of any one of Examples 14-27, wherein the chip package is a system-on-chip (SoC).

Example 29 includes the subject matter of any one of Examples 14-28, wherein the PCB is a motherboard.

Example 30 includes an apparatus comprising: a substrate comprising a plurality of layers; at least one via to provide electrical coupling between a first layer and a second layer of the substrate, the via comprising a plurality of wave spring discs in a stack.

Example 31 includes the subject matter of Example 30, wherein the wave spring discs are fixed with respect to the substrate.

Example 32 includes the subject matter of Example 30 or 31, wherein the wave spring discs are formed in a square wave shape.

Example 33 includes the subject matter of any preceding Example, wherein the wave spring discs are coupled together with bent, single conductor string formation.

Example 34 includes the subject matter of any preceding Example, wherein the wave spring disc form multiple paths that have diversified directions for direct current (DC) and high frequency current flows.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An interposer apparatus comprising:

a housing; and a plurality of interconnect probes positioned within the housing such that opposite ends of the interconnect probe are disposed outside the housing, wherein each interconnect probe comprises a first connector, a second connector, and a wave spring structure comprising a plurality of stacked wave spring discs conductively coupled between the first connector and the second connector, the interconnect probes spaced at a distance less than 0.45 mm.

2. The interposer apparatus of claim 1, wherein at least one interconnect probe comprises wave spring discs formed in a sinusoidal wave shape, and wherein peaks of the sinusoidal shape of adjacent discs are conductively coupled.

3. The interposer apparatus of claim 1, wherein at least one end of the interconnect probe is arranged to allow the wave spring structure to compress when pressure is applied to the end of the interconnect probe.

4. The interposer apparatus of claim 1, wherein at least one of the first or second connector of the interconnect probe is fixed with respect to the housing.

5. The interposer apparatus of claim 1, the wave spring discs of the wave spring structure are welded together.

6. The interposer apparatus of claim 1, wherein the wave spring discs of the wave spring structure are coupled together with conductive adhesive.

7. The interposer apparatus of claim 1, wherein the housing comprises first and second parallel outer surfaces, and at least one of the interconnect probes is positioned within the housing such that the first connector of the interconnect probe extends outward from the first parallel outer surface of the housing and the second connector of the interconnect probe extends outward from the second parallel outer surface of the housing.

8. The interposer apparatus of claim 7, wherein the first and second connectors extend orthogonally from the first and second outer surfaces of the housing, respectively.

9. The interposer apparatus of claim 7, wherein the first and second ends are disposed in different spatial locations of the housing with respect to at least one axis.

10. The interposer apparatus of claim 7, wherein the first and second ends extend non-orthogonally from the first and second outer surfaces of the housing, respectively.

11. A system comprising:

a chip package comprises a first set of electrical contact pads;

a printed circuit board (PCB) comprising a second set of electrical contact pads; and an interposer apparatus disposed between the chip package and PCB, the interposer apparatus comprising a plurality of interconnect probes to electrically connect the first set of electrical contact pads and the second set of electrical contact pads, each interconnect probe comprising a wave spring structure comprising a plurality of wave spring discs conductively coupled with one another in a stack, wherein a pitch of the interconnect probes is less than 0.45 mm.

12. The system of claim 11, wherein at least one interconnect probe comprises wave spring discs formed in a sinusoidal wave shape.

13. The system of claim 11, wherein at least one end of the interconnect probe is arranged to allow the wave spring structure to compress when pressure is applied to the end of the interconnect probe.

14. The system of claim 11, wherein at least one end of the interconnect probe is fixed with respect to the interposer.

15. The system of claim 11, wherein the chip package comprises a processor.

16. The system of claim 11, wherein the chip package is a system-on-chip (SoC).

17. The system of claim 11, wherein the PCB is a motherboard.

18. The system of claim 11, wherein the interposer comprises a housing with first and second parallel outer surfaces, and at least one of the interconnect probes is positioned within the housing such that a first end of the interconnect probe extends outward from the first parallel outer surface of the housing and a second end of the interconnect probe opposite the first end extends outward from the second parallel outer surface of the housing.

19. The system of claim 18, wherein the first and second ends extend orthogonally from the first and second outer surfaces of the housing, respectively.

20. The system of claim 18, wherein the first and second ends are disposed in different spatial locations of the housing with respect to at least one axis.

21. The system of claim 18, wherein the first and second ends extend non-orthogonally from the first and second outer surfaces of the housing, respectively.

* * * * *